United States Patent Office 3,392,099
Patented July 9, 1968

3,392,099
PRODUCTION OF FLUORO COMPOUNDS
William B. Fox, Jefferson Township, Morris County, and James S. MacKenzie, Parsippany, N.J., assignors to Allied Chemical Corporation, New York, N.Y., a corporation of New York
No Drawing. Filed Mar. 9, 1962, Ser. No. 179,520
7 Claims. (Cl. 204—177)

This invention is directed to processes for making the compound trifluoroamine oxide, $F_3NO$, a colorless gas at N.T.P.

Trifluoroamine oxide has been found to provide a fluorine-nitrogen-oxygen high energy propellant oxidizer. It has been proposed to make this compound by processes involving reaction of nitrogen trifluoride with materials such as oxygen difluoride and elemental fluorine. Objectives of this invention are to provide processes for making $F_3NO$ by procedures which do not require use of the costly oxygen difluoride or the hazardous elemental fluorine.

In accordance with the present invention, it has been found surprisingly that when nitrogen trifluoride is reacted with molecular oxygen under certain conditions, trifluoroamine oxide is synthesized and is produced in recoverable form.

Nitrogen trifluoride, $NF_3$, a known and available raw material, has a B.P. of about minus 129° C. at atmospheric pressure, an M.P. of about minus 216° C., and is a colorless gas at N.T.P.

Generally, practice of the processes of the invention comprises subjecting a starting mixture, consisting of nitrogen trifluoride and molecular oxygen, to the action of a silent electrical discharge effected in a reaction zone by maintaining across the reaction zone certain potential drops and certain amperages, and effecting the electrical discharge while maintaining in the reaction zone certain very low temperatures and pressures. We find that by so proceeding there is formed in the electrical discharge reaction zone a reaction product containing the compound $F_3NO$ which may be separated from unreacted starting materials and other reaction products, and recovered.

Apparatus which may be employed to carry out the processes of the invention is relatively simple, and may be substantially as described in the appended illustrative example. Apparatus embodies chiefly an electrical discharge tube constituting a reaction zone, plus suitable accessories for feeding starting materials to the reaction zone, for causing certain electrical discharge effects in the reaction zone, for maintaining certain temperatures and pressures in the reaction zone, and for recovering sought for product from the reaction zone. Although otherwise designed electrical discharge tubes may be employed, the discharge tube is preferably in the form of a U-tube provided at the upper end of one leg with a valve-controlled gas inlet, and at the upper end of the other leg with a valve-controlled gas outlet. Electrodes, made for example of nickel, copper, or iron but preferably nickel, project into the upper ends of the U legs, and are suitably connected to a high voltage transformer.

According to one factor of the invention, it has been found that the starting materials fed into the reaction zone should be subjected to the action of a silent electrical discharge effected in the reaction zone preferably by maintaining across the reaction zone a potential drop substantially in the range of 1–20 kilovolts at a current substantially in the range of 5–50 milliamperes. More desirably, potential drop and current are held substantially in the ranges of 5–15 kilovolts and 15–50 milliamperes. In view of the foregoing voltage and current features, specific design of suitable discharge tubes, with respect to such factors as diameter and axial length of reaction zone and axial spacing apart of the electrodes, is within the skill of the art. Discharge tubes may be made of quartz or other suitable materials such as Pyrex and alumina.

As noted, reactant starting materials employed are gaseous mixtures consisting of nitrogen trifluoride and molecular oxygen, i.e. substantially pure oxygen, which reactants may be in molecular proportions in the range of 0.25:1 to 6:1. To aid in minimization of formation of ozone, starting mixtures containing $NF_3$ and $O_2$ in proportions of at least one molecular proportion of $NF_3$ per mol of $O_2$ are preferred. While molecular excesses of $NF_3$ may be employed desirably, quantities of $NF_3$ greater than about 6 molecular proportions of $NF_3$ per mol of $O_2$ appear to serve no advantageous purpose. Preferably, the gaseous starting material mixtures charged consist of $NF_3$ and $O_2$ in mol proportions substantially in the range of 2:1 to 5:1. Starting material constituents may be proportioned in a premix tank as in the appended example, or feed of constituents to the discharge tube reaction zone may be effected by means of suitable metering equipment.

In accordance with the invention, it has been found that, correlative with electrical discharge, very low temperatures and pressures are needed to effect formation of the $F_3NO$ product in the reaction zone. In general, temperatures and pressures are both held low enough to effect condensation in the reaction zone of a reaction product cnotaining $F_3NO$. While temperature as high as about minus 160° C. may be used, ordinarily reaction temperatures are held in the lower range of about minus 180-minus 196° C. For the higher temperatures indicated, the reaction tube may be immersed in or otherwise refrigerated by a bath or slush of melting isopentane or melting dichlorodifluoromethane. Preferred reaction temperature is about minus 196° C., which may be maintained by a bath of liquid nitrogen.

Reactions should be carried out while maintaining low pressures in the reaction zone in the range of substantially zero up to about 150 mm. of Hg. Ordinarily, pressures substantially in the range of 2–100 mm. of Hg may be used for good results, while for best results, preferably pressures are held substantially in the range of 5–20 mm. of Hg. The indicated low pressures may be maintained in the electrical discharge reaction zone as by relative adjustment of the valve in the gas inlet pipe of the reaction zone and of a vacuum pump connected to a valve controlled gas outlet pipe of the reaction zone, as more particularly described in the appended example.

During the course of the reactions under the conditions stated, the discharge tube visibly glows, generally with color varying from blue to violet, and a reaction product is formed and condenses. Condensation of reaction product may be observed visually, and reaction product condenses in the discharge tube as a mixture of liquid and solid. Indications are that, in addition to $F_3NO$, the condensed reaction product contains materials such as $O_2F_2$, $NF_3$, $NO_2F$, $N_2O$, and $SiF_4$.

Recovery of $F_3NO$ from the reaction product collected in the discharge tube on cessation of feed of raw materials may be effected in any suitable manner. $O_2F_2$ is a major by-product. While at least a large portion of this material may be separated from $F_3NO$ in a distillation train such as illustrated in the appended example, $O_2F_2$ may be separated advantageously from the reaction product prior to recovery of $F_3NO$. Such procedure is preferred on the basis of safety and thoroughness of $O_2F_2$ removal from the system. Hence, on completion of reaction, the outlet and inlet valves of the reaction chamber may be closed, and the chamber warmed up sufficiently to vaporize the entire reaction product. Thereafter, the reaction zone may be cooled again to the temperature of liquid nitrogen. Vapor phase $O_2F_2$ decomposes to oxygen and fluorine which remain as gases when the valve of the reaction product is recondensed, and which gases may be bled out of the reaction zone on completion of recondensation. After disposal of oxygen and fluorine gases, $F_3NO$ may be recovered from the recondensate by any suitable vacuum fractional distillation procedure a representative illustration of which is detailed in following example demonstrating recovery of $F_3NO$ in a cold trap maintained at temperature of about minus 183° C.

The sought-for product has a boiling point of about minus 89° C. and a melting point of about minus 161° C. at atmospheric pressure, and is a colorless gas at normal conditions. The $F_3NO$ compound provides a missile ingredient, a powerful high energy oxidizer for missile fuels, and an intermediate for the preparation of other high energy propellant oxidizers. The $F_3NO$ compound lowers substantially the freezing point of the known $N_2O_4$ oxidizer, and correspondingly increases the utility range of $N_2O_4$. The following example is illustrative of practice of the processes of the invention.

In this run, apparatus employed was substantially as follows. Sources of gaseous $NF_3$, and gaseous molecular oxygen were connected thru valve-controlled conduits with a 3.3 liter steel premixing tank equipped with a pressure gauge. The tank was connected thru a valve-controlled inlet conduit to the top of the vertically disposed inlet leg of a U-shaped quartz electric discharge tube, the upper end of the vertically disposed outlet leg of which was connected to an outlet conduit having a control valve, and a pressure gauge intermediate the exit of the discharge tube and the control valve. The quartz discharge tube provided a U-shaped reaction zone having a diameter of about 18 mm., and a total axial length of about 250 mm. Projecting into the upper ends of the vertical legs of the discharge tube were nickel electrodes, axial distance between the ends of the electrodes within the reaction zone being about 100 mm. Outer ends of the electrodes were connected to a high voltage transformer. The tube outlet conduit, downstream of the control valve therein, was connected to the upstream end of a fractionation train comprising three series-connected U-tube traps. A conduit connecting the upper end outlet of the first U-tube with the upper end inlet of the second U-tube, and a conduit connecting the upper end outlet of the second U-tube with the upper end inlet of the third tube, were each provided with a control valve. The downstream end of the train was connected thru a valve-controlled conduit to a vacuum pump.

About 126 mmols of $NF_3$, and about 33 mmols of molecular oxygen and no other material were charged into the premix tank to provide a gas mixture therein having a total pressure of about 1210 mm. of Hg and an $NF_3:O_2$ mol ration of about 3.8:1. Source of supply to the premix tank was shut off, and the vacuum pump was put in operation to effectuate a high vacuum in the entire system including the electric discharge reaction tube and the fractionation train. The transformer was adjusted to impress across the electrodes a voltage of about 5 kilovolts at about 40 milliamperes. The valve in the gas line between the premix tank and the top end of the gas inlet leg of the discharge tube was opened. Operation of the vacuum pump at the tail end of the system and adjustment of the discharge tube inlet valve were such as to maintain throughout the run a pressure of about 10 to 20 mm. of Hg in the quartz discharge tube, such pressure being observable by the pressure gauge associated with the gas exit conduit of the discharge tube. Overall gas flow rate of the $NF_3-O_2$ mixture into the discharge tube was about 80 mmols per hour. Throughout the run, temperature in the quartz electric discharge tube was maintained at about minus 196° C. by means of a liquid nitrogen bath, and the tube glowed with a blue-to-violet color. Operation was continued for about two hours at which time the entire charge in the premix tank was expended.

On completion of the reaction run, the transformer was turned off, and the valve in the outlet conduit of the discharge tube was closed. The orange colored liquid and solid reaction mixture in the discharge tube was warmed up sufficiently to vaporize all of the reaction zone contents, a substantial portion of the vapor of the latter backing up into the premix tank. Purpose of such vaporization was to effect destruction of $O_2F_2$ which decomposes to the oxygen and fluorine gases which are uncondensable under the conditions of operations. After standing a few hours at room temperature, materials, other than oxygen and fluorine gases in the reaction zone and premix tank, were recondensed and collected in the reaction zone at about minus 196° C. Subsequent to recondensation, the value in the exit line of the discharge tube was opened, and uncondensable gases, mostly oxygen and fluorine, were purged from the system by the vacuum pump.

The material remaining in the discharge tube was subjected to fractional distillation by vaporizing such material while in the discharge tube and passing the resulting gas stream successively thru the three U-traps of the fractionation train. The first trap (the trap immediately adjacent the electric discharge tube) was maintained at a temperature of about minus 160° C. by immersion in a slush-like mixture of freezing isopentane. The second trap was maintained at temperature of about minus 183° C. by means of an oxygen bath, and the third trap was maintained at temperature of about minus 196° C. by means of a bath of liquid nitrogen. During fractionation, pressures in the entire system including the discharge tube and the three traps were maintained very low, e.g. from about 2 mm. up to about 5 mm. The first trap condensate was a mixture of white solid and yellow liquid, which condensate at room temperature was a vapor shown by infrared and mass spectral analyses to contain a substantial amount of $F_3NO$. In the second trap, minus 183° C., there were recovered about 4–5 mmols of condensate shown by tests including infrared spectrum and mass spectrum to be mostly $F_3NO$. The third trap condensate contained unreacted $NF_3$.

The compound trifluoroamine oxide, $F_3NO$, of the structure

is described in copending application Ser. No. 179,521, of Fox, MacKenzie and Vanderkooi, filed of even date herewith.

We claim:

1. The process for making trifluoroamine oxide which comprises subjecting a starting mixture, consisting of nitrogen trifluoride and molecular oxygen to the action of an electrical discharge effected in a reaction zone by maintaining across said zone a potential drop substantially in the range of 1–20 kilovolts at a current substantially in the range of 5–50 milliamperes, effecting said electrical discharge while maintaining in said zone temperature substantially in the range of minus 160–minus 196° C. and pressure in the range of substantially zero–150 mm. of Hg absolute, whereby there is formed in said zone, a condensed reaction product containing $F_3NO$, and discharging $F_3NO$ from said zone.

2. The process of claim 1 in which temperature is substantially in the range of minus 180–minus 196° C. and pressure is substantially in the range of 2–100 mm. of Hg absolute.

3. The process of claim 1 in which the starting material charged consists of $NF_3$ and $O_2$ in mol proportions in the range of about 1:1 to 6:1.

4. The process for making trifluoroamine oxide which comprises subjecting a starting mixture, consisting of nitrogen trifluoride and molecular oxygen and containing at least about one molecular proportion of $NF_3$ per mol of $O_2$, to the action of an electrical discharge effected in a reaction zone by maintaining across the reaction zone a potential drop substantially in the range of 1–20 kilovolts at a current substantially in the range of 5–50 milliamperes, effecting said electrical discharge while maintaining in the reaction zone temperature substantially in the range of minus 160–minus 196° C. and pressure in the range of substantially zero–150 mm. of Hg absolute, whereby there is formed in the reaction zone a condensed reaction product containing $F_3NO$ and $O_2F_2$ as impurity, raising temperature sufficiently to vaporize said condensed reaction product and decompose $O_2F_2$ to uncondensable gases, recondensing other constituents of the vaporized reaction products, and recovering $F_3NO$ from the recondensed condensate.

5. The process for making trifluoroamine oxide which comprises subjecting a starting mixture, consisting of nitrogen trifluoride and molecular oxygen in mol proportions in the range of about 2:1 to 5:1, to the action of an electrical discharge effected in a reaction zone by maintaining across the reaction zone a potential drop substantially in the range of 5–15 kilovolts at a current substantially in the range of 15–50 milliamperes, effecting said electrical discharge while maintaining in the reaction zone temperature of substantially minus 196° C. and pressure substantially in the range of 5–20 mm. of Hg absolute, whereby there is formed in the reaction zone a condensed reaction product containing $F_3NO$, and recovering $F_3NO$ from such reaction product.

6. The process for making trifluoroamine oxide which comprises subjecting a starting mixture, consisting of nitrogen trifluoride and molecular oxygen to the action of an electrical discharge effected in a reaction zone by maintaining across said zone potential drop and current conditions to form in said zone a visible glow, effecting said electrical discharge while maintaining in said zone temperature not higher than about minus 160° C. and pressure not higher than about 150 mm. of Hg absolute to thereby form in said zone a condensed reaction product containing $F_3NO$, and discharging $F_3NO$ from said zone.

7. The process for making trifluoroamine oxide which comprises subjecting a starting mixture of nitrogen trifluoride and oxygen to the action of an electrical discharge in a reaction zone, effecting said electrical discharge while maintaining said zone at a cryogenic temperature, whereby there is formed in said zone a reaction product containing trifluoroamine oxide, and recovering said trifluoroamine oxide.

No references cited.

ROBERT K. MIHALEK, *Primary Examiner.*

HOWARD S. WILLIAMS, CARL D. QUARFORTH,
*Examiners.*

J. D. VOIGHT, B. R. PADGETT, *Assistant Examiners.*